United States Patent [19]
Alderman

[11] Patent Number: 5,828,560
[45] Date of Patent: Oct. 27, 1998

[54] VOLTAGE CONVERTER CIRCUIT

[76] Inventor: Robert J. Alderman, 686 Highland Ter., Canyon Lake, Tex. 78133

[21] Appl. No.: 823,373

[22] Filed: Mar. 24, 1997

[51] Int. Cl.$^6$ ..................................................... H02M 3/18
[52] U.S. Cl. ............................................. 363/60; 307/110
[58] Field of Search ................................ 636/60; 307/110

[56] References Cited

U.S. PATENT DOCUMENTS

| | | | |
|---|---|---|---|
| 3,553,479 | 1/1971 | Nelson | 307/110 |
| 3,820,004 | 6/1974 | Sugiura et al. | 321/15 |
| 3,824,447 | 7/1974 | Kuwabara | 321/15 |
| 4,321,661 | 3/1982 | Sano | 363/60 |
| 4,636,930 | 1/1987 | Bingham et al. | 363/60 |
| 5,028,812 | 7/1991 | Bartky | 307/246 |
| 5,095,223 | 3/1992 | Thomas | 307/110 |
| 5,397,931 | 3/1995 | Bayer | 327/306 |
| 5,436,587 | 7/1995 | Cernea | 327/536 |
| 5,461,557 | 10/1995 | Tamagawa | 363/60 |
| 5,481,447 | 1/1996 | Caris et al. | 363/60 |
| 5,491,623 | 2/1996 | Jansen | 363/60 |
| 5,600,551 | 2/1997 | Luscher, Jr. | 363/60 |

*Primary Examiner*—Stuart N. Hecker
*Attorney, Agent, or Firm*—Thomas, Kayden, Horstemeyer & Risley

[57] ABSTRACT

A voltage converter circuit and method are provided. The circuit includes an input and an output, and has one or more stages that operate to increase the voltage between the input and the output. In one embodiment, each of these stages includes a first and second charging capacitor, and a transistor interposed between the first and second charging capacitors. In addition, a plurality of diodes are interconnected among the transistor and the first and second charging capacitors. The diodes are specifically configured to respond to a voltage applied to the input so that when a voltage is present at the input, the first and second charging capacitors are effectively connected in parallel across the input. However, when the voltage applied to the input is near zero, the diodes serve to effectively connect the first and second charging capacitors in series relationship through the transistor, so that the voltage across each of the first and second charging capacitors is added and applied to the output. The method includes the steps of providing a time-varying voltage to a circuit input, configuring a plurality of charging capacitors in parallel fashion across the input, when a voltage is present across the input, in order to charge the charging capacitors, and reconfiguring the plurality of charging capacitors in series relationship, in response to a change in the magnitude of the input voltage, to transfer the cumulative charge of the charging capacitors to an output.

25 Claims, 5 Drawing Sheets

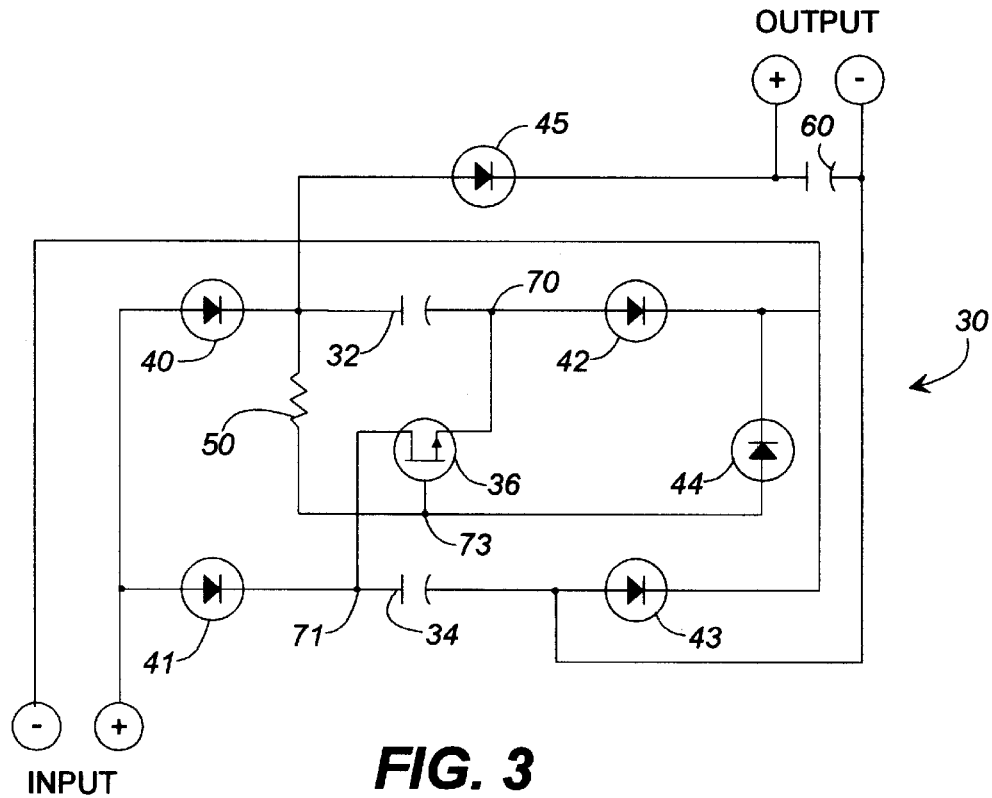
FIG. 3
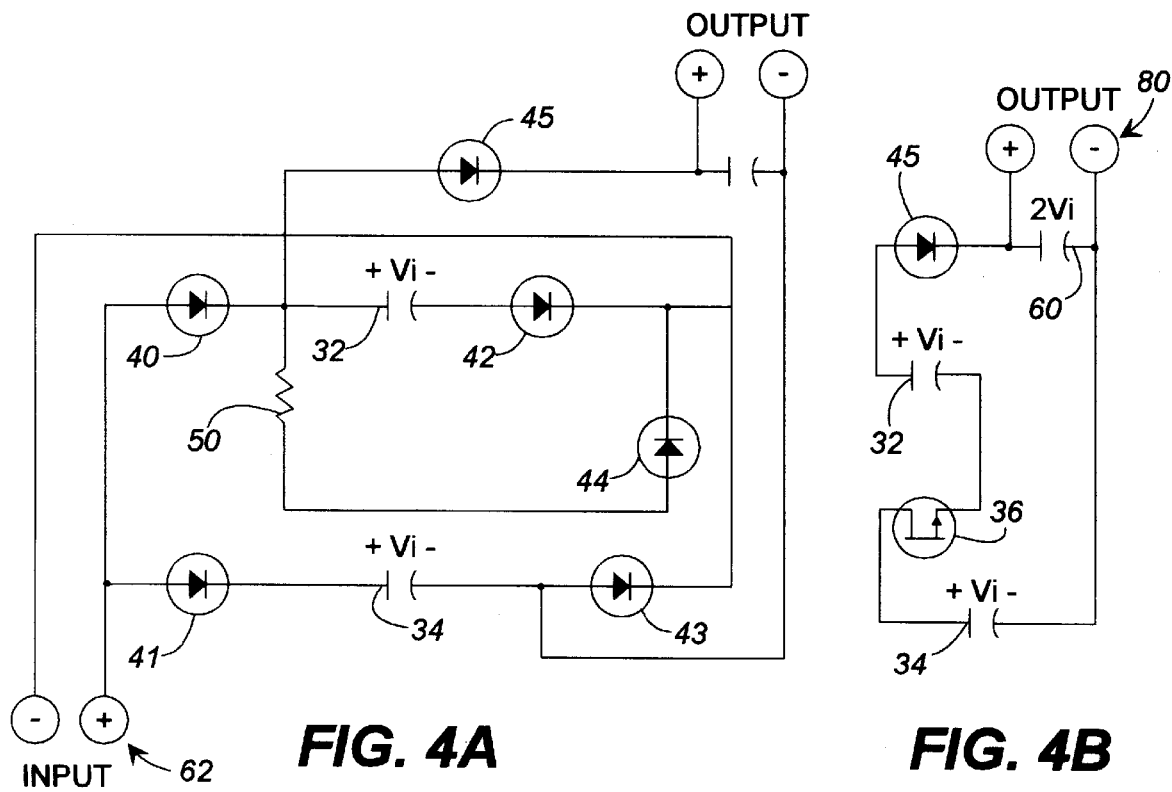
FIG. 4A  FIG. 4B

VOLTAGE CONVERTER CIRCUIT

BACKGROUND OF THE INVENTION

1. Field of the Invention

The present invention generally relates to voltage converter circuitry, and more particularly to a voltage converter circuit for providing a general purpose and highly efficient step-up voltage converter.

2. Discussion of the Related Art

Voltage converter circuits that operate to increase, or step-up a voltage between an input and an output, are widely known and used in a variety of applications. Nevertheless, there are a number of technological areas where there exists a yet unfulfilled present need for low cost, and high efficiency step-up type voltage converters.

One application in which step-up type voltage converters are presently used is in flash units for cameras. In a typical low-power flash unit, batteries of a relatively low voltage (such as AA or AAA batteries) are used to power and generate a high intensity flash. The circuitry used in such flash units commonly utilizes a relatively high frequency oscillator or multi-vibrator circuit to create an oscillation of the otherwise dc input voltage provided by the batteries. The oscillatory voltages is then applied to the primary winding of step-up transformer, which generates a relatively high output voltage across the secondary winding. This high voltage output is applied to a storage or "tank" capacitor until sufficient charge is accumulated to effectively operate the flash lamp. Such a level of charge is often indicated by a light emitting diode (LED) to give a visual indication to the user that the flash unit is ready for operation.

It is well known that the use of step-up transformers to effect the voltage increase in a voltage converter circuit suffers from diminished efficiency. More particularly, by converting the electrical voltage from the batteries/oscillator circuit into magnetic form, as passes through the core of the transformer, and then converting back to electrical form at the secondary winding of the transformer, such conversion necessarily results in a loss of power and thus efficiency from the overall circuit. The observable consequences from this are two-fold. First, it takes a longer period of time to charge the tank capacitor to a level to sufficiently operate the flash. Second, it also diminishes the life of the batteries, insofar as the battery life is measured by the number cycles or flashes of the flash unit.

Accordingly, there is a need to provide an enhanced voltage converter that overcomes these shortcomings. Namely, one having improved efficiency and speed.

As previously mentioned, there are technological areas where there presently exists an unfulfilled need for low cost, highly efficient step-up type voltage converters. One such technological area in which Applicant has identified a need for a step-up voltage converter relates to the private use a pay-type telephone. In a pay-type telephone, there is an input slot for receiving inserted coins. As coins are input, they are typically held in an intermediate area until the telephone directs them either to an internal storage bin (i.e., accepting the coins) or to the coin return. For example, a user of a pay-type public telephone must insert coins into the telephone in order to obtain a dial tone and place a telephone call. If, however, it turns out that the call is either unanswered or the line or the other end is busy, the coins inserted into the telephone are returned to the user by way of a coin return relay. In pay telephone systems, this coin return relay is operated by a pulse of electrical power of approximately 70 volts. The typical power voltage on a telephone line is 50 volts, which drops to approximately 15 to 25 volts (depending upon the loop length) when the receiver, or handset is taken off-hook. On public telephone line, this 70 volt coin return activating pulse is generated at the central office.

Many private businesses, however, offer privately owned, pay-type telephones for the use and convenience of their customers. Rather than operating off a public line, these phones are installed to operate off private, leased lines. The problem, however, is that the central office is not configured to generate a coin return activating pulse on such lines. Therefore, without modification to such phones, the coin return relay, typically installed in those phones, cannot operate properly.

One solution would be to replace the coin return relay with one that operates off a much lower voltage. However, the coin return relay often differs from among phones, and is sometimes difficult to find and/or expensive to order. Furthermore, circuitry must still be added to the telephone in order to sense those situations where the relay must be activated. It has been found that a more appealing and lower cost approach is achieved by providing a voltage converter circuit to step-up a relatively low power input voltage to a sufficient level to operate the coin return relay provided in such phones.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a voltage converter circuit. In accordance with one aspect of the invention, the voltage converter circuit includes an input and an output, and has one or more stages for increasing the voltage between the input and the output. In one embodiment, each of these stages includes a first and second charging capacitor, and a transistor interposed between the first and second charging capacitors. In addition, a plurality of diodes are interconnected among the transistor and the first and second charging capacitors. The diodes are specifically configured to respond to a voltage applied to the input so that when a voltage is present at the input, the first and second charging capacitors are effectively connected in parallel across the input. However, when the voltage applied to the input is near zero, the diodes reverse bias to effectively remove themselves from the circuit and connect the first and second charging capacitors in series relationship through the transistor, so that the voltage across each of the first and second charging capacitors is added and applied to the output.

In accordance with one embodiment, the voltage converter circuit operates as a "one-shot", or on a one time basis. In this regard, a voltage is applied to the input for a sufficient period of time to allow the first and second charging capacitors to charge to a predetermined voltage level. Then, the input voltage is removed, or otherwise controlled to go to a near zero value. Responding to this changed input voltage, the voltage converter circuit series connects the charging capacitors and applies the summed voltage to the output. This embodiment is particularly suited for applications such as a telephone coin return relay, which will be discussed further in the detailed description.

In accordance with another embodiment, the voltage at the input to the converter is controlled so as to oscillate. In this embodiment a relatively large storage or "tank" capacitor is connected across the output (protected by a blocking diode). With each oscillation of the input voltage, the charging capacitors are repeatedly switched from series connected to parallel connected relationships. When in series, the individual voltages of the charging capacitors are applied to the tank capacitor to charge it. This embodiment may be utilized, for example, in an electronic flash for a camera, where a relatively large power must be stored in order to properly operate the flash.

It will be appreciated that various design trade-offs and implementations may be made, consistent with the concepts and teachings of the present invention. For example, the charging time may be decreased by utilizing a greater number of smaller valued capacitors. Another variation may be realized by circuit duplication and parallelism. For instance, in an embodiment that utilizes an output tank capacitor, that capacitor is charged over a plurality of cycles. Each "cycle" is defined by a charging period, during which an input voltage is applied to the input to charge the charging capacitors, and a discharge period, during which time the charge stored in the charging capacitors is transferred to the tank capacitor. Assuming that the charging period and discharge period are equal in time duration, the efficiency (as measured in accordance with charging time) is fifty percent. It will be appreciated that a second, "parallel" circuit could be added and configured so that one circuit is charging, while the other is discharging. Such a configuration would realize twice the efficiency of a single circuit.

In accordance with another aspect of the present invention a method for increasing a voltage is provided. The preferred method includes the step of applying a time-varying voltage to an input of a voltage converter circuit. Depending upon the needs of a particular application, this time-varying aspect may include an oscillatory voltage that oscillates between a positive and negative going voltage, or a voltage that oscillates between some positive or negative value and a near zero value. Alternatively, the time-varying aspect may simple mean a voltage that varies on a one time basis, whether that variance is between some positive and negative value, or between some value and a near zero value.

The method aspect of the present invention further includes the steps of configuring a plurality of charging capacitors in parallel fashion across the input, when a voltage is present across the input, to charge the charging capacitors, then reconfiguring the plurality of charging capacitors in series relationship, in response to a change in the magnitude of the input voltage, as described above. Finally, the method includes the step of applying the cumulative charge of the charging capacitors to an output.

DESCRIPTION OF THE DRAWINGS

The accompanying drawings incorporated in and forming a part of the specification, illustrate several aspects of the present invention, and together with the description serve to explain the principles of the invention. In the drawings:

FIG. 3 is a schematic diagram illustrating a single stage of a circuit utilized to increase an input voltage, in accordance with the preferred embodiment of the invention;

FIG. 4A illustrates the effective or operative circuitry of the circuit illustrated in FIG. 3, when a voltage is applied to the input;

FIG. 4B illustrates the effective or operative circuitry of the circuit illustrated in FIG. 3, when the voltage applied to the input is changed to a near zero value;

Figure 1:
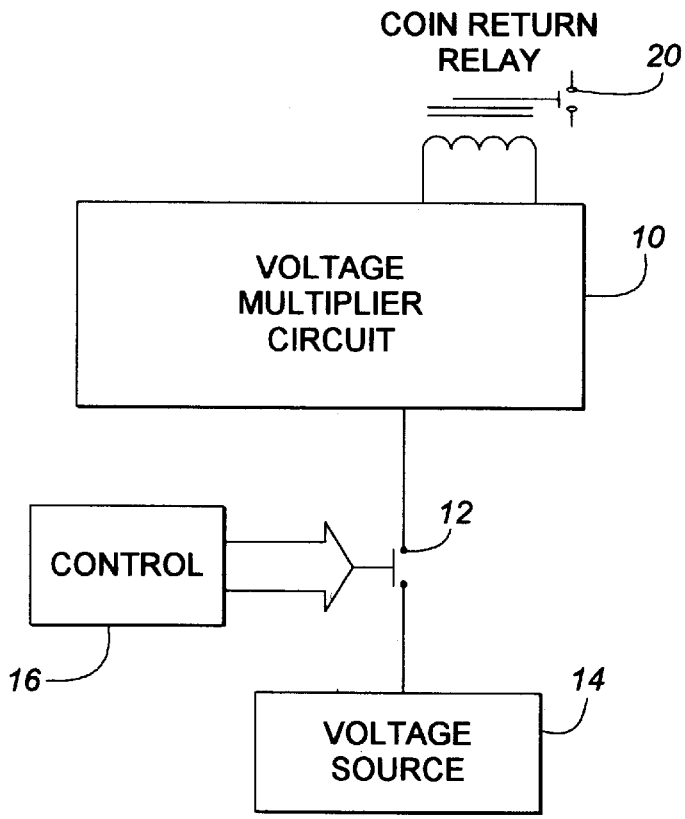
FIG. 1 is a top-level block diagram of the present invention as employed to operate a coin return relay.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 2:
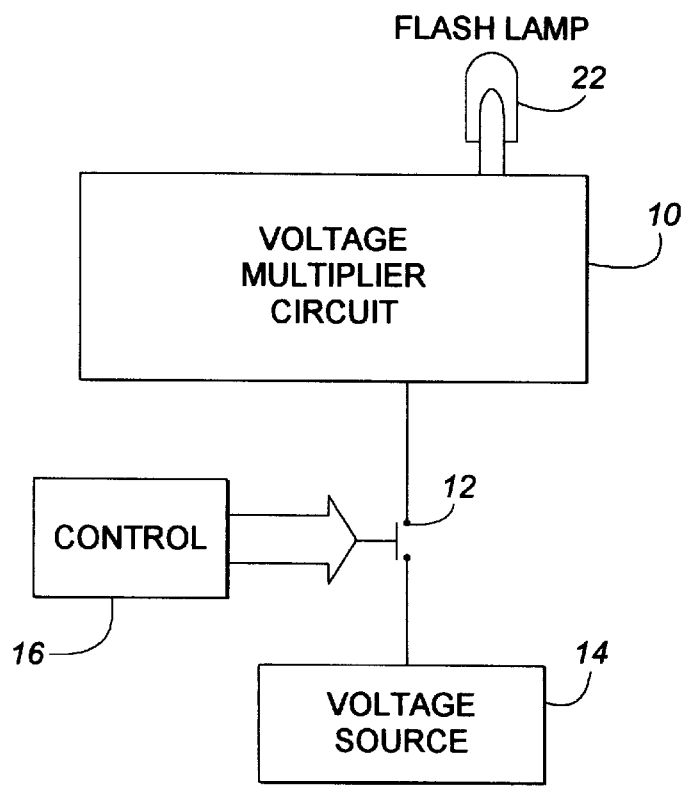
FIG. 2 is a top-level block diagram of the present invention similar to FIG. 1, but illustrating the invention as employed to operate a electronic flash.

Referring now to the drawings, reference is made to FIGS. 1 and 2, which illustrate a top-level block diagram of the present invention in two different embodiments. In this regard, the present invention is directed broadly to a voltage converter or voltage multiplier circuit 10. The voltage multiplier circuit 10 has both an input and an output. The input receives a relatively low voltage input, which is converted by the multiplier circuit 10 and directed to the output. As will be described in more detail below, the operation of the multiplier circuit 10 of the preferred embodiment performs in response to an oscillatory input signal. Preferably, the input oscillates between a near zero voltage value and some positive voltage value. However, it will be appreciated by those skilled in the art that similar operation could be achieved with a pure oscillatory input signal. Indeed, even for purposes of the preferred embodiment, a pure oscillatory input signal (i.e., both positive and negative going values) could be converted simply by inserting an diode into the input circuit to clip the negative going voltage value, and thus achieve an input signal oscillating between some positive voltage value and a near zero voltage value. Indeed, as previously mentioned, depending upon the needs of a particular application, the oscillating or time-varying aspect of the input signal may include an oscillatory voltage that oscillates between a positive and negative going voltage, or a voltage that oscillates between some positive or negative value and a near zero value. Alternatively, the time-varying aspect may simple mean a voltage that varies on a one time basis, whether that variance is between some positive and negative value, or between some value and a near zero value.

Merely for purposes of illustration, FIGS. 1 and 2 are illustrated as having a switch 12, a voltage source 14, and a block denoted as control 16. The switch 12 is illustrated as a normally-open, momentarily-closed one-way switch. The voltage source, which could be a battery, is applied to the input of the voltage multiplier circuit 10 when the switch 12 is closed, and is removed from the input of the voltage multiplier 10 when the switch 12 is opened. The control block 16 operates to open and close the switch 12 so as to apply and remove the voltage of voltage source 14 from the input of the voltage multiplier circuit.

The switch 12, voltage source 14, and control block 16 together illustrate the functionality of a oscillatory voltage applied to the input of the voltage multiplier circuit. The actual circuitry used to implement this feature will necessarily vary from embodiment to embodiment in a manner that will be understood by one of ordinary skill in the art. For example, in one embodiment, the input circuitry may be controlled to repeatedly oscillate the voltage applied to the input, so as to allow a large storage or tank capacitor, disposed across the output, to charge. Periodically, the output would be controlled to discharge. In another embodiment, the input circuitry may be controlled in a "one-shot" fashion. In such an embodiment, the output would be controlled to discharge for each oscillation of the input.

Again, the embodiments illustrated in FIGS. 1 and 2 are presented purely for illustrative purposes, and they illustrate two different environments or uses for the voltage multiplier circuit 10 of the present invention. FIG. 1 illustrates the invention in connection with the activation and operation of a high voltage coin return relay 20, which operates in a manner previously described. Preferably, this embodiment operates in a "one-shot" fashion. FIG. 2 illustrates the invention used in connection with an electronic flash unit for a camera, wherein the voltage multiplier circuit 10 generates a high voltage output for operating a flash lamp 22.

Turning now to FIG. 3, reference is made to the circuitry embodied in a voltage multiplier circuit that is constructed in accordance with the invention. As will be further described below, in the presently preferred embodiment (See FIG. 6), the voltage multiplier circuit of the present invention may include a plurality of identically constructed stages or sections. For simplicity of description, FIG. 3 illustrates a single stage, and for that reason, will be first described in order to facilitate the understanding of the multi-stage implementation of the preferred embodiment of the present invention.

FIG. 3 illustrates a voltage multiplying circuit 30 having two charging capacitors 32 and 34 interconnected in part through a transistor 36. In the preferred embodiment, a field effect transistor is utilized. However, a bipolar transistor may be used for certain applications and embodiments as well. Diodes 40, 41, 42, 43, 44, 45, and resistor 50 are also interconnected as illustrated in FIG. 3. Optionally, a storage or tank capacitor 60 may be provided across the output terminals for storing and accumulating a larger amount of power. In a manner that is known by those skilled in the art, by switching the operation of the voltage multiplier circuit 30 to intermittently provide the high voltage across the output terminals, over time charge may be accumulated and stored in the tank capacitor 60. Then, when needed, the stored charge may be dumped to an output device, such as a flash lamp.

By way of introduction, the invention operates by applying the relatively low voltage input across a plurality of capacitors, to charge those capacitors in parallel fashion. Then, once those capacitors have reached a charge of sufficient level, they are switched into a series relationship so that voltage accumulated across each charging capacitor 32, 34 is added to form a larger voltage value, which is placed across the output of the circuit. Therefore, as would be understood by one of ordinary skill in the art, the amplification of the multiplier circuit is proportional to the number of charging capacitors that are disposed in parallel relation.

With this introduction, reference is now made to FIGS. 4A and 4B to more particularly describe the operation of the circuit illustrated in FIG. 3. As previously described, the voltage provided by an external source, such as a battery, is applied to the input, or input terminals 62 in a time-varying or oscillatory fashion. Preferably, the voltage applied to input will vary between some positive value (as indicated by the polarity of the input terminals 62 and some value near zero value). FIG. 4A illustrates the effective, or operative, circuit components when a positive voltage value is applied to the input 62, and FIG. 4B illustrates the effective or operative circuit components when the voltage is removed from the input.

To explain in more detail, when a positive voltage is applied at the input 62, that voltage is also applied across the series connection of diode 40, capacitor 32, and diode 42. Similarly, the same input voltage is, in parallel fashion, applied across the series connection of diode 41, capacitor 34, and diode 43. Neglecting the relatively small voltage drop across each of the diodes, the vast majority of the input voltage at 62 is present across both capacitors 32 and 34 This voltage has been denoted in the drawings as Vi. In this respect, and again ignoring the voltage drop across the diodes 40, 41, 42, 43, and 44, capacitors 32 and 34 are effectively connected and parallel. Therefore, the same voltage Vi is applied across both capacitors 32, 34 to simultaneously charge each capacitor 32, 34. For purposes of the broad concepts and teachings of the present invention, the diodes 40, 41, 42,.43, 44 and 45 are functional, and it is irrelevant whether they are constructed from silicon, germanium, gallium arsenide, or some other semiconductive material. Certainly, as will be appreciated by those skilled in the art, one material or type of diode may be preferred over another for a given use or embodiment of the invention.

In keeping with the description of FIG. 4A, as a positive value input voltage is applied at 62, the transistor 36 is effectively removed from the circuit. This is because diode 44 prevents the transistor 36 from turning on. Stated another way, the voltage drop across diode 44 is equal to that across diode 42. Therefore, the potential or voltage at the gate 73 of the transistor is the same as the potential at the drain 70 (see FIG. 3) of the transistor 36, and therefore the transistor 36 cannot turn on.

When, however, the charging capacitors 32 and 34 have charged to a sufficient level and the voltage is removed from the input 62, then the circuit of FIG. 3 effectively becomes that illustrated in FIG. 4B. For purposes of this discussion, it will be assumed that the capacitors 32 and 34 sufficiently charge to a level Vi. Upon removal of the input voltage, the charge of capacitor 32 causes the transistor 36 to turn on. Diodes 42 and 44 become reverse biased and effectively drop from the circuit, and the capacitors 32 and 34 become series connected through the source and drain of transistor 36. Again, ignoring the voltage drop across the transistor 36, and the voltage drop across diode 45, the value of the voltages stored in capacitors 32 and 34 will be added and applied to the output 80. Thus, the voltage at the output will be approximately 2Vi. As previously described in connection with FIG. 3, a tank capacitor 60 may be applied across the output so that the voltage 2Vi operates to charge this tank capacitor 60.

Figure 5:
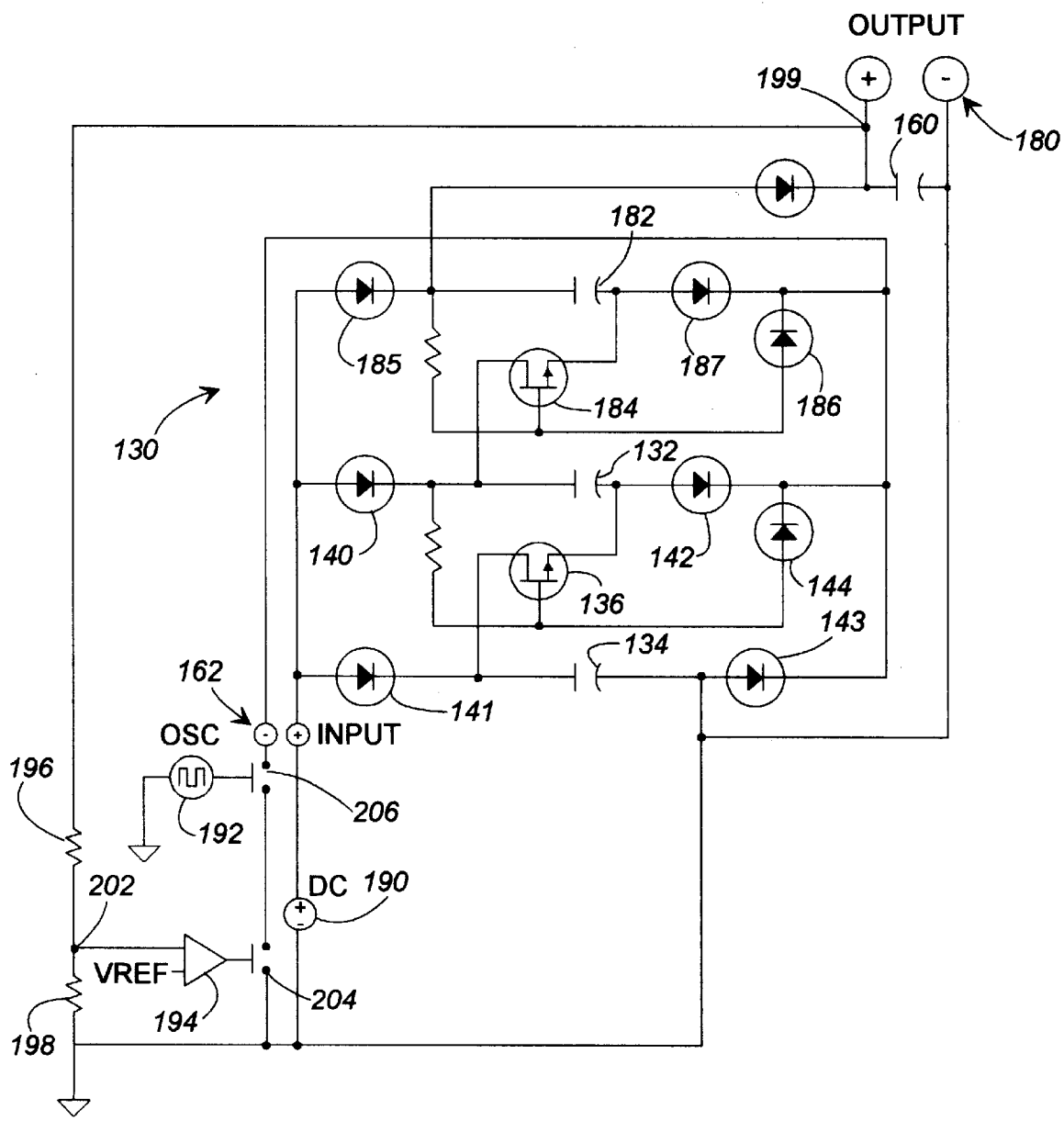
FIG. 5 is a schematic diagram similar to that of FIG. 3, but illustrating a multiple staged circuit, along with an diagrammatic input circuit for effecting an oscillation of the input voltage, as may be used with the voltage converter circuit for an electronic flash.

Reference is now made to FIG. 5 which shows a similar, but expanded circuit embodiment of the voltage multiplier circuit 130. An additional capacitor 182 is added so that there are three capacitors 182, 132, and 134 operating within the circuit. The operation of the lower part of the circuit (that including capacitor 132 and 134 and transistor 136, along with the surrounding diodes 140, 141, 142, 143 and, 144) operates in a fashion similar to that described in connection with the circuit of FIGS. 3, 4A, and 4B. An additional stage, however, is added to this circuit which includes capacitor 182, transistor 184, and diodes 185, 186 and 187. Without presenting a detailed description like that presented in connection with FIG. 3, it will be understood by one skilled in the art that the overall circuit of FIG. 5 operates much like that described in connection with FIG. 3. Specifically, when a voltage is applied to the input 162, that same voltage (ignoring the voltage drop across the diodes) is applied across capacitors 182, 132, and 134). In this way, these three capacitors are effectively connected and parallel. Then, when the voltage source is removed from the input terminals 162, and in the manner described in connection with FIG. 4B, the capacitors 182, 132, and 134 become effectively connected in series through transistors 184 and 136. The sum of the three individual voltages across each of the capacitors, then, is applied to the output 180.

Figure 6:
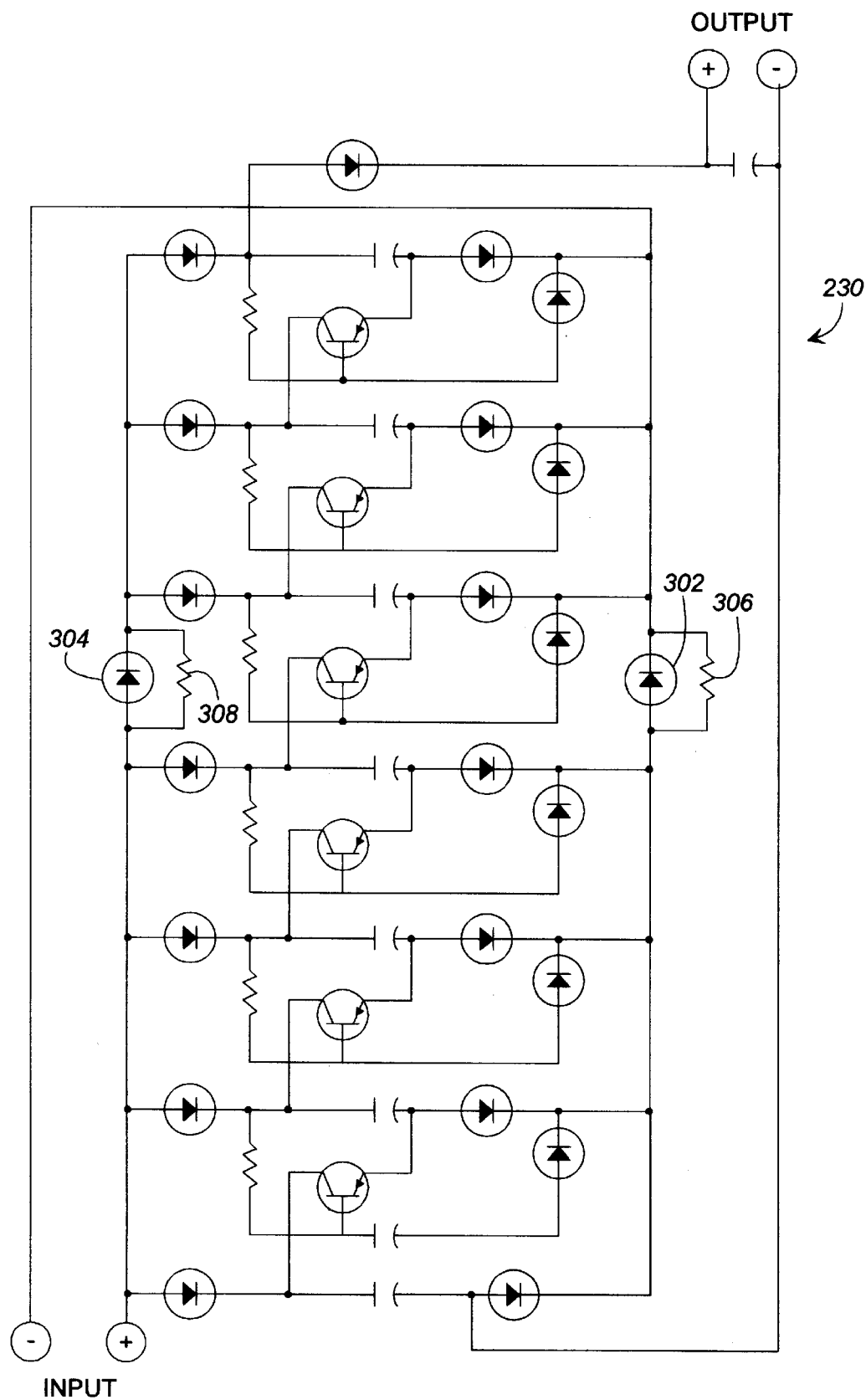
FIG. 6 is a schematic diagram illustrating a multi-staged converter circuit constructed in accordance with on aspect of the present invention.

As will be further illustrated in FIG. 6, additional stages may be cascaded to the voltage multiplier circuit to further increase the gain, or multiplication factor, achieved by the circuit. As illustrated in FIG. 5, however, each adjacent stage preferably shares a common charging capacitor. For example, in FIG. 5, charging capacitor 132 is shared by the two stages.

FIG. 5 further illustrates a very simplistic input voltage control circuitry, having a battery 190, and oscillator 192 and a comparator 194. As will be described below, this circuitry is configured to operate in such a way as to apply the input voltage from battery 190 across the input terminals 162 in an oscillatory fashion, until such time as the tank capacitor 160 at the output 180 has charged to a sufficient level. Thereafter, the battery 190 is effectively disconnected from the input. In this regard, the predetermined output voltage may be set to be equal to a reference value denoted as VREF, and this value may be applied to one of the inputs of comparator 194. The output voltage at junction 199 is divided across resistors 196 and 198, so that the value at an intermediate junction 202 is connected to the other input of comparator 194. Certainly, by choosing values of resistors 196 and 198 to effect the ratios therebetween, one can adjust the value by which the comparator 194 becomes operative.

In operation, the switch 204 would be closed by comparator 194 until the output has reached a level sufficient to turn the capacitor 194 on and thus open the switch 204, effectively removing the battery 190 from the input by opening the circuit at the negative going terminal of the input 162. While the switch 202 remains closed, and thus the circuit operative, oscillator 192 may be used to intermittently open and close switch 206 to thus provide the time varying application of the battery 190 to the input 162. Again, the input circuit embodied in FIG. 5 is not necessarily reflective of the preferred embodiment, but merely is provided to be illustrative of a how a controlled input may be applied to the multiplier circuit 130 at the present invention. For example, a multiplier circuit used in connection with an electronic camera flash.

Reference is briefly made to FIG. 6 which shows yet a further embodiment of the present invention. The embodiment illustrated in FIG. 6 shows a circuit similar to that described in both FIGS. 3 and FIGS. 5, having even a greater number of multiplier stages. In addition, this embodiment illustrates the use of bipolar transistors rather than field effect transistors, and further illustrates the use of diodes 302 and 304. Functionally, these diodes 302, 304 do not effect the broad functional operation of the circuit. However, in practice, it is preferred to provide high voltage diodes 302 and 304 in connection with large resistors 306 and 308 (e.g., 10 mega-ohm) to help spread the leakage current realized by the other diodes of the circuit. This feature becomes particularly important as the number of stages for the multiplier circuit 230 is increased. Although FIG. 6 has illustrated one diode/resistor pair on each side of the circuit, multiple diode resistor pairs could be similarly disposed along each side.

One advantage of the present invention is that the components may be entirely implemented in a solid state integrated circuit, and therefore manufactured at a relatively low cost. Unlike a camera flash unit described in the Background, which employs a step-up transformer to achieve the voltage multiplication, the multiplier circuit of the present invention may be much more cost-effectively produced. Furthermore, by operating exclusively electronically, the multiplier circuit of the present invention operates much more efficiently than does that of the type utilizing a step-up transformer.

Figure 7:
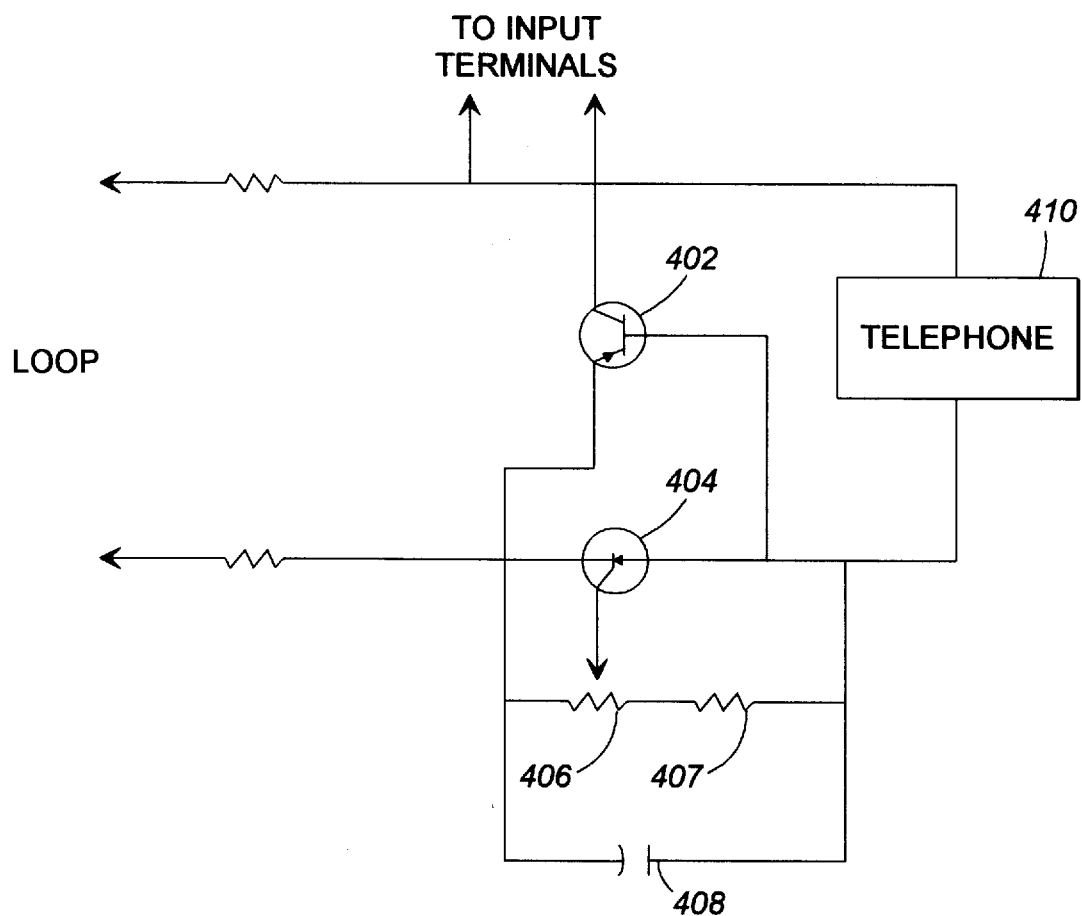
FIG. 7 is a schematic diagram illustrating an input circuit for use with a voltage converter used for operating a coin return relay.

Reference is now made to FIG. 7, which illustrates the input circuitry preferably utilized in connection with the voltage multiplier circuit for operating a coin return relay.

Preferably, this input circuit utilizes a transistor 402, an silicon controlled rectifier (SCR) 404, a variable resistor 406, and capacitor 408, in connection with the telephone 410. FIG. 7 illustrates the two wire "Tip" and "Ring" lines coming off the local telephone loop. As is well known, the voltage across this loop is approximately 50 volts, dc, when the telephone 410 is on-hook. However, when a user picks up the telephone handset and takes the phone off-hook, the voltage across the loop drops to approximately 15–25 volts, depending upon the length of the local loop.

This input circuit of FIG. 7 operates as follows. When the telephone 410 is taken off-hook, the transistor 402 turns on to apply the approximately 15–25 volt loop voltage to the input of the voltage multiplier circuit (not shown in FIG. 7). During this initial time period, the SCR 404 is off, and a voltage begins to increase across the variable resistor 406 (and possibly additional resistor 407). As will be appreciated by those skilled in the art, this rate of this voltage increase is determined by the value of resistors 406, 407 and capacitor 408 (i.e., R-C time constant). Once this voltage reaches a predetermined value, the SCR 404 turns on, which in turn, turns off the transistor 402. This removes the loop voltage from the input to the multiplier circuit, and in a manner previously described, the voltage multiplier circuit multiplies the prior input voltage (15–25 volts) to an amount sufficient to actuate the coin return relay.

As previously mentioned, the coin return relays on pay-type telephones operate at a voltage of approximately 70 volts. Therefore, a five stage multiplier circuit will be sufficient to actuate the relay (e.g., 15 volts times 5=75 volts).

As will be further appreciated, the component values of resistor 406 and capacitor 408 will be selected based upon the charging capacitors utilized in the multiplier circuit. Specifically, component values will be chosen to allow the charging capacitors to sufficiently charge. Preferably, a time period of approximately two seconds will be preferred, so that a user would not have to wait too long to retrieve his coins.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A voltage converter circuit having an input and an output and one or more stages for increasing the voltage between the input and the output, each stage comprising:

a first and second capacitor;

a transistor interposed between the first and second capacitors; and a plurality of diodes interconnected among the transistor and the first and second capacitors, the plurality of diodes being configured to respond to a voltage applied to the input so that when a voltage is present at the input the first and second capacitors are effectively connected in parallel across the input, the plurality of diodes being further configured to respond to a voltage applied to the input so that when the voltage applied to the input is near zero, the first and second capacitors are effectively connected in series relationship through the transistor, so that a voltage across each of the first and second capacitors is added and applied to the output.

2. The voltage converter as defined in claim 1, further including a plurality of stages.

3. The voltage converter as defined in claim 1, wherein one of the first and second capacitors is shared between two adjacent stages.

4. The voltage converter as defined in claim 1, further including means for providing a time-varying voltage to the input.

5. The voltage converter as defined in claim 4, further including a tank capacitor connected across the output.

6. The voltage converter as defined in claim 3, wherein the means for providing a time-varying voltage to the input further operates to oscillate the voltage between some positive value and a near zero value.

7. The voltage converter as defined in claim 4, wherein the plurality of diodes respond to the oscillating input voltage to repeatedly configure the first and second capacitors between parallel and series configurations, and this repeated operation operates to charge the tank capacitor.

8. The voltage converter as defined in claim 4, wherein the means for providing a time-varying voltage to the input includes an oscillator.

9. The voltage converter as defined in claim 6, wherein the means for providing a time-varying voltage to the input includes an oscillator.

10. A voltage converter circuit comprising:

input terminals for receiving an input voltage;

output terminals for delivering a high voltage pulsed output;

a circuit interconnected between the input terminals and the output terminals having a plurality of charging capacitors;

at least one switching means responsive to a voltage across the input terminals, the switching means being interposed between two of the plurality of the charging capacitors, the switching means being configured to electrically interconnect the two of the plurality of charging capacitors in parallel when the a voltage is present at the input terminals, the switching means being further configured to electrically interconnect the two of the plurality of charging capacitors in series when the voltage at the input terminals is near zero, the circuit being configured so that the voltages across the two of the plurality of charging capacitors is added and placed across the output terminals.

11. The voltage converter as defined in claim 10, wherein the switching means includes a transistor.

12. The voltage converter as defined in claim 11, wherein the switching means includes a plurality of diodes.

13. The voltage converter as defined in claim 10, wherein the input voltage is a dc voltage.

14. The voltage converter as defined in claim 10, wherein the input voltage is a time-varying voltage.

15. The voltage converter as defined in claim 14, wherein the time-varying voltage is an ac voltage.

16. The voltage converter as defined in claim 10, further including means for providing a time-varying voltage to the input.

17. The voltage converter as defined in claim 16, further including a tank capacitor connected across the output terminals.

18. The voltage converter as defined in claim 17, wherein the means for providing a time-varying voltage to the input further operates to oscillate the voltage between some positive value and a near zero value.

19. The voltage converter as defined in claim 18, wherein the switching means responds to the oscillating input voltage to repeatedly configure the first and second capacitors between parallel and series configurations, and this repeated operation operates to charge the tank capacitor.

20. A method for increasing a voltage comprising the steps of:

applying a time-varying voltage to an input;

configuring a plurality of charging capacitors in parallel fashion across the input, when a voltage is present across the input, to charge the charging capacitors;

reconfiguring the plurality of charging capacitors in series relationship, in response to a change in the magnitude of the input voltage, and applying the cumulative charge of the charging capacitors to an output.

21. The method as defined in step 20, further including the step of charging a tank capacitor connected across the output by oscillating the time varying input voltage to repeatedly execute the configuring and reconfiguring steps.

22. The method as defined in step 20, wherein the step of reconfiguring the charging capacitors is responsive to a change in the magnitude of the input voltage to a near zero value.

23. The method as defined in claim 20, where the applying step is executed by intermittently applying a do voltage to the input.

24. The method as defined in claim 20, wherein the applying step is executed by continuously applying an input signal having a time-varying voltage magnitude.

25. The method as defined in claim 24, wherein the time-varying input signal is an ac signal.

* * * * *